E. W. TUCKER.
CAMERA.
APPLICATION FILED APR. 25, 1917.
1,345,288.
Patented June 29, 1920.
3 SHEETS—SHEET 1.
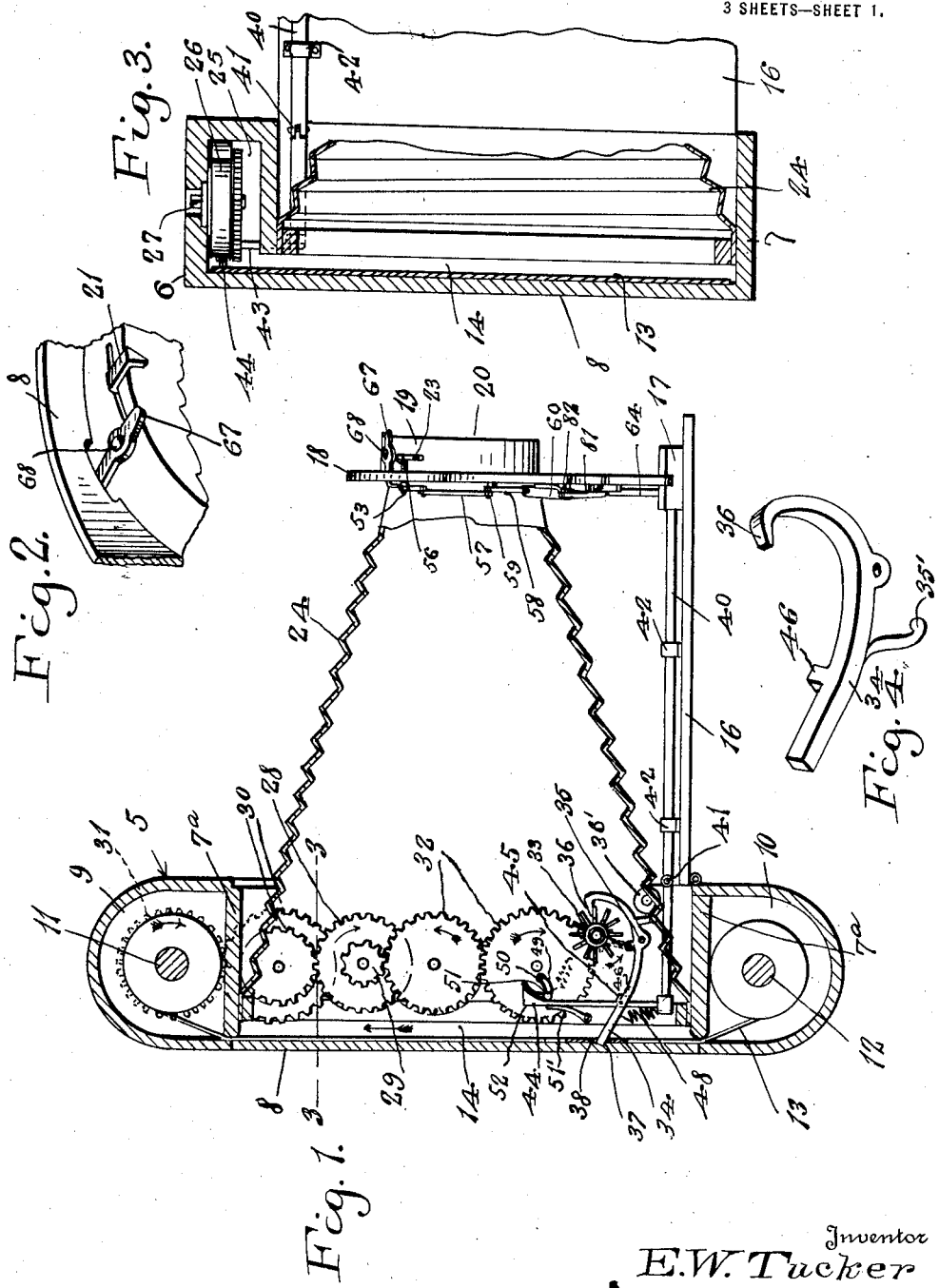
Witnesses:
Inventor
E. W. Tucker
Attorney

E. W. TUCKER.
CAMERA.
APPLICATION FILED APR. 25, 1917.

1,345,288.

Patented June 29, 1920.

Witnesses

Inventor
E. W. Tucker
By
Attorney

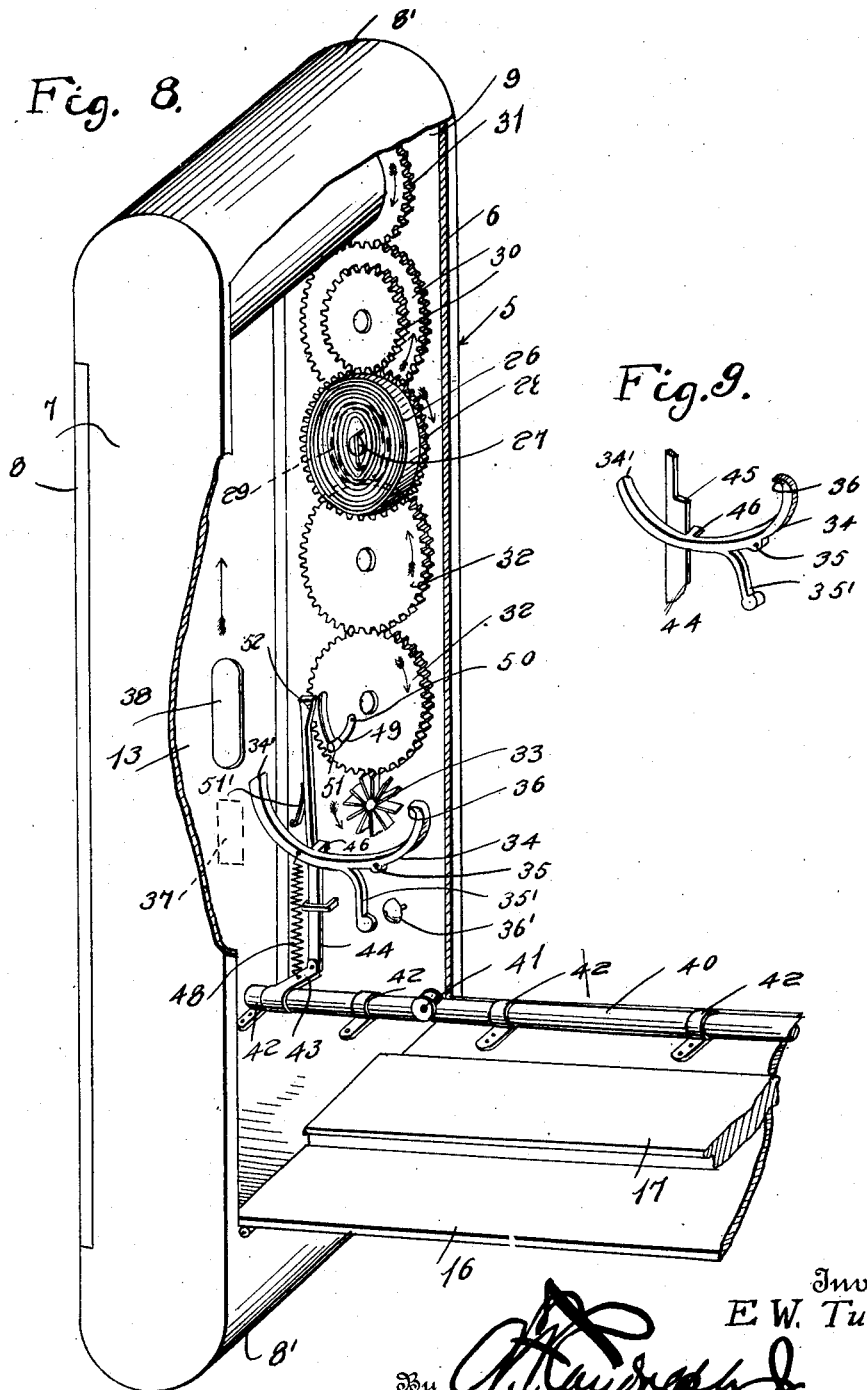

UNITED STATES PATENT OFFICE.

EDWIN W. TUCKER, OF NORTH PRAIRIE, WISCONSIN.

CAMERA.

1,345,288.    Specification of Letters Patent.    Patented June 29, 1920.

Application filed April 25, 1917. Serial No. 164,406.

*To all whom it may concern:*

Be it known that I, EDWIN W. TUCKER, a citizen of the United States, residing at North Prairie, in the county of Waukesha and State of Wisconsin, have invented certain new and useful Improvements in Cameras; and I do hereby declare the following to be a full, clear, and exact description of the invention, such as will enable others skilled in the art to which it appertains to make and use the same.

This invention relates to improvements in cameras of the type which employ roll films, and the invention has for its object to provide a shutter controlled mechanism for automatically actuating the film to bring the successive sections thereof into position behind the exposure opening, thereby relieving the operator of the annoying task of winding up a section of the film subsequent to each exposure.

Another object is the provision of an automatic film winding device including means controlled by the shutter mechanism, permitting the shutter to be opened and closed by independent movements of the shutter lever without disturbing the film until the exposure is terminated.

With these and other objects in view, the invention consists in the novel construction, combination and arrangement of parts as will be hereinafter specifically described, claimed and illustrated in the accompanying drawings, in which:

Figure 1 is a side elevation, partly in section, of the improved camera,

Fig. 2 is a fragmentary perspective view of the shutter and support therefor,

Fig. 3 is a horizontal transverse sectional view on the line 3—3 of Fig. 1,

Fig. 4 is a perspective view of the film stop lever,

Fig. 8 is a perspective of the camera casing open, parts thereof being broken away, Fig. 9 is a perspective of the film-releasing lever and associated elements.

Figure 5:
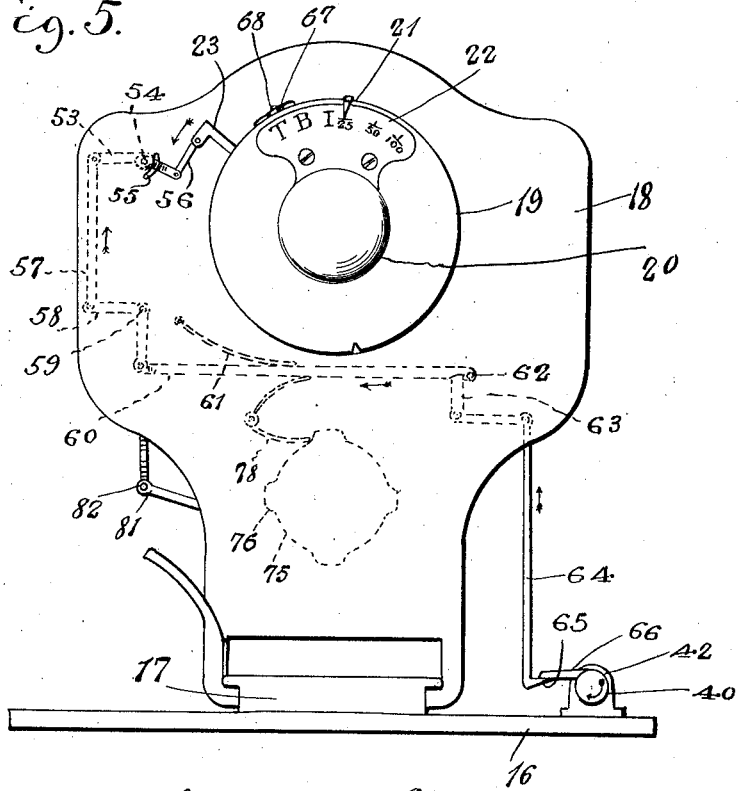
Fig. 5 is a front elevation of the shutter lens support and hinged front of a camera.

Referring to the drawings in detail, wherein similar reference numerals designate corresponding parts throughout the several views, the numeral 5 indicates generally the casing of the camera including side walls 6 and 7 connected adjacent their opposite extremities by partitions 7, and a removable rear wall 8, having curved terminals 8' overlying the rounded edges of the side walls 6 and 7. The ends of the casing are provided with the usual film spool-receiving chambers 9 and 10, in which are arranged the detachable film-receiving and film-feeding spools 11 and 12, respectively. A film 13, secured at one end to the spool 12, extends behind the exposure opening 14 in the casing and is fastened at its opposite end to the receiving spool 11, upon which it is adapted to be wound to successively present the various sections of the film in position for exposure in the opening 14.

The casing is provided with a hinged front wall 16, carrying a track 17 for the slidable shutter support 18, which latter is adapted to be moved longitudinally upon the track 17 to properly focus an object. The shutter, designated generally by the numeral 19, includes the usual lens 20, shutter controlling finger 21, which is movable over the indicator 22, and the shutter actuating lever 23.

As clearly shown in Fig. 1, the shutter support 18 supports the forward end of a bellows 24 and the rear end of the latter is secured to the side walls 6 and 7 and the partitions 7ª.

As illustrated in Fig. 3, the side wall 6 is preferably of a greater thickness than the side wall 7, and is provided with an internal chamber 25 extending longitudinally thereof and communicating at one end with the film-receiving spool chamber 9. A spring 26 is coiled about a shaft 27, journaled through the wall 6 and having one end squared and extended exteriorly of the casing to receive a suitable key, whereby the spring may be conveniently wound. A gear wheel 28 is also keyed to the shaft 27, and is adapted to be rotated in the direction of the arrow indicated in Fig. 1 by the tension of the coil spring 26. The gear wheel 28 is connected by a train of gears 30 with a gear wheel 31 secured to the supporting stud (not shown) for the film-receiving spool 11, whereby the spring, when released, rotates the film-receiving spool 11 in the direction of the arrow to wind the film thereon. A gear wheel 29 is also keyed to the shaft 27 and is connected by a train of gears 32 with a bladed escapement wheel 33. A film stop lever 34 is pivoted at 35 under the bladed wheel 33 and is provided with an angular terminal 36, adapted to engage between the blades to lock the wheel 33, together with the several other gear wheels, against rotation. From its pivotal axis 35, the lever 34 extends rearwardly toward the removable back 8, and is adapted to engage in a recess 37 formed in the camera back. The film 13 is formed with a plurality of spaced marginal apertures 38, spaced a distance apart equal to the length of the exposure opening 14, and so arranged as to receive the rear terminal 34′ of the stop lever 34, whereby the film is intermittently stopped so as to present the successive sections thereof in position for exposure in the opening 14.

As will be understood, the film shifting mechanism, which is operated by the spring 26, is normally locked against rotation by the angular terminal 36 of the stop lever 34, engaging the wheel 33. The stop lever 34 is actuated at each operation of the shutter by the oscillation of a shaft 40, operated directly from the shutter 19. The shaft 40 extends longitudinally of the front wall 16 and is composed of two sections hingedly connected at 41, thus permitting the front section to be folded to closed position. The sections of the shaft are rotatably supported in bearings 42. As shown in Fig. 8, the rear terminal of the shaft 40 is provided with an outwardly directed arm 43, pivotally connected with a vertically disposed trip rod 44. The trip rod 44 is provided with a horizontally disposed shoulder 45 adapted to engage a laterally projecting lug 46 on its upward movement. The lug 46 is formed adjacent the rear terminal of the stop lever 34 to tilt the latter upon its axis, and thus release the film-receiving spool. The release of the spool is effected by the return movement of the rod 44, as will be hereinafter more fully described.

As the lever 34 is tilted, so as to disengage the film 13, the angular terminal 36 of the lever is withdrawn from the blades of the wheel 33, thereby releasing the several gear wheels and permitting the latter to rotate under the influence of the spring 26 to wind the film upon the film-receiving spool 11. A coil spring 48, connected with the arm 43 and the shaft 40, is also connected with the rear terminal of the lever 34, and normally retains the latter in engagement with the film 13. An arm 49 is pivotally secured at 50 to the lowermost gear wheel of the train 32 and is provided with a laterally projecting pin 51, adapted to engage the cam surface 52 formed on the upper terminal of the trip rod 44 to tilt the latter rearwardly during the winding of the film to disengage the shoulder 45 from the lug 46 of the lever 34, and thus permit the lever 34 to be swung against the film 13 under the influence of the spring 48. A leaf spring 51′ serves to normally retain the shoulder 45 of the rod 44 in engagement with the lug 46 of the lever 34. The rear terminal of the lever 34 remains in sliding contact with the surface of the film 13 until one of the openings 38 in the film is moved into registration with the recess in the camera back.

Upon the registration of the rear end 34′ of the lever 33 with the successive opening 38 in the film 13 an arm 35′, depending from the lever 34, is adapted to strike a bell 36′ and thus advise the operator that the winding of the exposed roll is completed.

The film-actuating and stopping mechanism, hereinbefore described, is controlled by the shutter mechanism 19, the arm 23 of which is pivotally connected with a lever 53 pivoted at 54 to the back of the shutter support 18. One arm of the lever projects through an arcuate slot 55 formed in the support 18, and is pivotally connected by a link 56 with the shutter-actuating lever 23. The opposite terminal of the lever 53 is pivotally connected by a link 57 with a bell crank 58, pivoted at 59 to the back of the shutter support 18, and having the arm opposite the link 57 connected with a latch rod 60, which is normally retained in depressed position by the tension of a leaf spring 61. The free end of the pivoted latch rod 60 is recessed to define a shoulder 62, which engages one arm of a bell crank 63, pivoted to the back of the support 18, and having its opposite end connected with a lift rod 64, provided with an angular lower terminal 65 engaging a laterally projecting plate 66 carried by the front end of the horizontally disposed shaft 40.

When the lever is actuated to make an exposure of a section of the film 13, the bell cranks 58 and 63 are rocked by the links 56, 57 and 60, and the rocking movement of the lever 53 effects an upward pull upon the lift rod 64, the angular terminal 55 of which tilts the plate 56 and oscillates the shaft 40, thereby drawing the trip rod 44 downwardly against the tension of the spring 48. When the shutter lever 23 is released the tension of the spring 48 returns the trip rod 44 to its initial position and the shoulder 45 engaging the lug 46 of the lever 34 tilts the latter upon its pivotal axis, disengaging the angular terminal 36 thereof from the bladed wheel 33 and also releasing the rear terminal of the lever from engagement with the recess 37, thereby permitting the film to be wound upon the film-receiving spool 11, which is actuated by the spring 26, as will be understood.

The finger 21 by which the action of the blades of the shutter is controlled is adapted to engage and tilt a relatively short lever 67 pivoted at 68 to the casing of the shutter mechanism 19.

The rear terminal of the relatively short lever 67 is pivoted to a link 69, which is attached to a bell crank 70, pivotally supported upon the rear face of the shutter support 18 and connected at its opposite end with a link 71, having connection with a bell crank 72. An arm 73 is pivoted at 74 to the support 18 and rotatably supports a wheel or disk 75 having a plurality of equidistant cams or projections 76 thereon. The wheel or disk 75 is arranged underneath the latch rod 60 and may be swung from one position to another by the bell crank 72, which is connected to the arm 73 by a link 77. A bell crank 78 is pivoted at 79 to the shutter support 18 and engages the under side of the latch rod 60 and also the periphery of the disk 75. When the arm 73 is swung to the right by engagement of the finger 21 with the lever 67, the disk 75 is moved laterally with the arm 73 and one of the projections 76 of the disk engages the bell crank 78 and tilts the latter so as to elevate the latch rod 60 and disengage the latter from the arm of the bell crank 63.

The rear face of the disk 75 is provided with a plurality of laterally projecting ratchet teeth 80, which are adapted to be engaged by a pawl 81, pivoted at 82 to the shutter support 18. The pawl 81 is connected with one arm of the bell crank 58 by a link or cable 83, and is adapted to be actuated thereby.

Figures 6, 7:
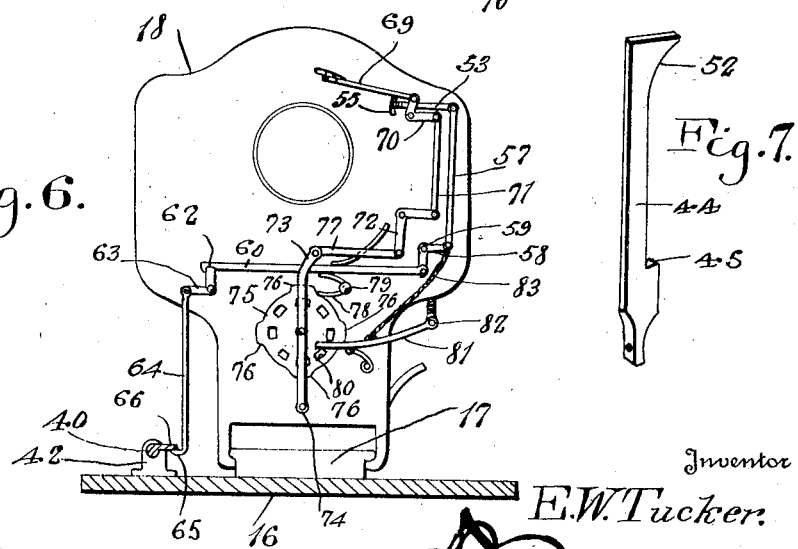
Fig. 6 is a transverse vertical sectional view through the hinged camera front, showing the lens support in rear elevation, the bellows being removed.
Fig. 7 is a perspective view of the trip rod removed.

When operating the finger 21 of the shutter mechanism for making a time exposure of any duration whatever, the finger is engaged with the lever 67, tilting the latter and moving the arm 73 to the right, in Fig. 6, through the link 69, bell crank 70, link 71, bell crank 72 and link 77. During the movement of the arm 73 to the right, one of the projections 76 of the disk 75 engages and tilts the bell crank 78, thereby elevating the latch rod 60 and disengaging the recessed terminal thereof from the bell crank 63 and disconnecting the shutter actuating lever 23 from the lift rod 64. Thus, when the shutter lever 23 is actuated to initially open the shutter, the film-actuating and stopping mechanism remains inoperative. The movement of the shutter lever 23 is, however, imparted to the pawl 81 through the lever 53, link 57, bell crank 58 and cable 83, thus swinging the pawl upon its axis and engaging it with the ratchet teeth 80 and effecting a rotational movement of the disk 75. The movement of the disk 75 removes the projection 76 from engagement with the bell crank 78, thus permitting the latch rod 60 to drop into operative engagement with the bell crank 63, and upon the final actuation of the shutter lever 23 to close the shutter, the movement of the lever is transmitted to the shaft 40 and the shutter-actuating and stopping mechanism is set in operation to wind a section of the film upon the film-receiving spool 11 and subsequently stop the film, as previously described.

What I claim is:

1. In a camera, a casing, film-receiving and feeding spools rotatably mounted therein, means normally tending to rotate the receiving spool to wind a film thereon, means to secure the film against movement in the casing, a shutter mechanism, means controlled by the shutter mechanism to release the securing means, and means carried by the securing means to lock the first-mentioned means against operation when the film is secured against movement.

2. In a camera, a casing, a film-receiving spool mounted therein, means normally tending to rotate the spool to wind a film thereon, means to lock the film against movement, means for releasing the locking means, and means operable by the locking means to control the operation of the first-mentioned means.

3. In a camera, a casing, a film-receiving spool mounted therein, means to wind a film upon the spool, a shutter mechanism including actuating means and controlling means therefor, means to secure the film against movement, means controlled by the shutter-actuating means to release the securing means, means controlled by the shutter-controlling means to disconnect the actuating means for the shutter from the securing means during the initial movement of the actuating means, and means to reestablish connection between the shutter-actuating means and the securing means upon subsequent operation of the shutter-actuating means.

4. A camera comprising, a casing, film-feeding and receiving spools rotatably mounted therein, a train of gears arranged in the casing, a spring connected with the train of gears and adapted to rotate said film-receiving spool, a second train of gears, a bladed escapement wheel meshing with the second-named train of gears, a film stop lever pivoted intermediate its ends to said casing and adapted to engage said escapement wheel to lock said film-receiving spool against rotation, the opposite end of said film stop lever being adapted to engage the film to permit of the engagement of the film stop lever with the escapement wheel, a shutter for the camera, and means connecting the shutter with the film stop lever to actuate the same upon the movement of the shutter.

5. A camera comprising, a casing, film-feeding and receiving spools rotatably mounted therein, a spring having connection with said film-receiving spool and adapted to normally rotate the same, a bladed escapement wheel having connection with said spring, a film stop lever pivoted intermediate its ends to said casing and adapted to engage said escapement wheel to lock the film-receiving spool against rotation, the opposite end of said film stop lever being adapted to engage the film to permit of the engagement of the film stop lever with the escapement wheel, a shutter for the camera, and means connecting the shutter with the film stop lever to actuate the same upon the movement of the shutter.

6. A camera comprising, a casing, film-feeding and receiving spools rotatably mounted therein, a spring adapted to normally rotate said film-receiving spool; a bladed escapement wheel having connection with said spring, a film stop lever pivoted intermediate its ends to said casing and adapted to engage said escapement wheel to lock the film-receiving spool against rotation, the opposite end of said film stop lever being adapted to engage a film to permit of the engagement of the film stop lever with the escapement wheel, a shutter for the camera, and means connecting the shutter with the film stop lever to actuate the same upon the movement of the shutter.

7. A camera comprising, a casing, film-feeding and receiving spools rotatably mounted therein, a train of gears arranged in the casing, a spring connected with the train of gears and adapted to rotate said film-receiving spool, a second train of gears, a bladed escapement wheel meshing with the second-named set of gears, a film stop lever pivoted intermediate its ends to said casing and adapted to engage said escapement wheel to lock said film-receiving spool against rotation, the opposite end of said film stop lever being adapted to engage a film to permit of the engagement of the film stop lever with the escapement wheel, a shutter for the camera, and means connecting the shutter with the film stop lever to actuate the same upon the movement of the shutter.

In testimony whereof I affix my signature in presence of two witnesses.

EDWIN W. TUCKER.

Witnesses:
  MAE E. TUCKER,
  MARY E. WILSON.